(12) United States Patent
    Clark et al.

(10) Patent No.: US 12,255,789 B2
(45) Date of Patent: Mar. 18, 2025

(54) CUSTOMER SATISFACTION INDEX FOR SERVICE LEVEL AGREEMENT MONITORING

(71) Applicant: Tangoe US, Inc., Stamford, CT (US)

(72) Inventors: Dale L. Clark, Mukilteo, WA (US); Jaan Leemet, Aventura, FL (US)

(73) Assignee: TANGOE US, INC., Stamford, CT (US)

( * ) Notice: Subject to any disclaimer, the term of this patent is extended or adjusted under 35 U.S.C. 154(b) by 0 days.

(21) Appl. No.: 18/359,652

(22) Filed: Jul. 26, 2023

(65) Prior Publication Data

US 2024/0073108 A1 Feb. 29, 2024

Related U.S. Application Data

(60) Provisional application No. 63/400,193, filed on Aug. 23, 2022.

(51) Int. Cl.
*H04L 41/5022* (2022.01)
*H04L 41/5067* (2022.01)

(52) U.S. Cl.
CPC ...... *H04L 41/5022* (2013.01); *H04L 41/5067* (2013.01)

(58) Field of Classification Search
None
See application file for complete search history.

(56) References Cited

U.S. PATENT DOCUMENTS 11,095,533 B1 * 8/2021 Hermoni ............... H04L 43/067
2018/0332485 A1 * 11/2018 Senarath ............... H04L 41/044

* cited by examiner

*Primary Examiner* — Quang N Nguyen
(74) *Attorney, Agent, or Firm* — Farber LLC; Jonathan Adam Winter

(57) ABSTRACT

A system is provided for measuring and determining responsiveness of service providers to determine customer satisfaction score in order to re-prioritize handling of incoming service requests and for adjusting how responsiveness of different systems is computed based on feedback from users concerning satisfaction and feedback indicative of satisfaction or dissatisfaction such that the system over time learns how to reprioritize requests to avoid or reduce customer cancellations and/or service downgrades.

17 Claims, 5 Drawing Sheets

CUSTOMER SATISFACTION INDEX FOR SERVICE LEVEL AGREEMENT MONITORING

FIELD OF THE INVENTION

The present invention relates to systems and methods for monitoring adherence to service level agreements in telecom expense management applications and assessing and optimizing customer satisfaction by using a system of weights that are dynamically adjusted using machine learning to prioritize and classify an indexed value.

BACKGROUND OF THE INVENTION

Service Level Agreements (SLAs) in the telecom industry are often used to set parameters for how a provider will provide contracted services within a given timeframe and within negotiated quality guidelines. As an example, an SLA may cover a situation where a person orders a new mobile phone with a certain configuration to be delivered to a person within a certain timeframe with a certain expectation of accuracy and quality.

While SLAs are primarily a means of measuring adherence to a contractual obligation, meeting a contractual obligation does not always provide a good measure of customer satisfaction. This is particularly true when a customer has multiple systems with a given vendor. Looking at overall customer satisfaction with a vendor, and more particularly, considering a measure of the potential risk of customer attrition, loss or reduced engagement or commitment, it is important to take a more holistic view.

Take for example the situation where an SLA may be based on threshold values such as requiring an incoming phone call to be picked up within 5 minutes. This does not mean that customers will be happy to have their calls answered at just under 5 minutes on every call. It is more of a maximum outlier value that cannot be exceeded in order to stay within an SLA. In such cases, even if the SLA is honored, but every call has a relatively long wait, it's likely that customer satisfaction will be quite low, at least for those that are calling and being made to wait for the maximum time allowed by the SLA.

Similarly, a customer may have 1000 calls in a month, out of which, almost every call is answered within a few seconds. However, there may be just one or two times when due to an event, the call waiting time went beyond the 5-minute SLA limit. In this case, despite one or two off occurrences of a lengthy wait time for a couple of individuals, the vast majority of calls were answered well below the SLA. In this situation it is quite likely that the customer satisfaction for this vendor will be very high despite violating the terms of the SLA on one or two occasions for the month in question.

Another example would be where a customer may have multiple systems with a given vendor and while all the other systems are working perfectly and performing well within their SLAs, one of the systems starts having trouble. A vendor supplying ordering systems, support systems, and recycling may be doing very well, but for some reason, the ordering system begins to lag behind. Orders are delayed or errors are made in orders. Although the support and recycling services are well within their SLAs and performing at a high level, it's quite likely that satisfaction in connection with that vendor will be low, all due to one system performing poorly.

Further, the interaction between systems may be indirect but may also have a significant impact on overall satisfaction. Even if support is measured on its response times, if the ordering system is making errors and the standard turnaround for replacements is a week, customers will be unhappy. In this situation, regardless of how well support may do with regard to SLA related metrics like the friendliness and response time of the agents taking the calls, customers are likely to be unhappy and provide a low customer satisfaction rating.

Also consider a system where a customer has a particular model of phone, which is operational on a given carrier network. While the phone and the network are from two separate vendors and entities, one is very much related to the other in that if the phone cannot get good coverage or service, users will be upset with their phones and customer satisfaction may drop for both vendors. It is unlikely that the user will separate the network from the phone in their satisfaction rating. Rather, his experience of using the phone (which needs the network) will be impacted even if the phone works very well on other networks.

The above examples are meant to highlight some sample areas where customer satisfaction is not directly related to the adherence to an SLA and how interactions and relationships between multiple systems may have a negative impact on customer satisfaction across multiple vendors. So, while most SLAs are put in place to promote customer satisfaction, they may not always be the best indicators as to whether customers are happy and there may be customer attrition risk despite SLA metrics being satisfactory and below the negotiated thresholds.

U.S. patent application Ser. No. 14/149,182 separates the concept of customer satisfaction from SLA conformance, but fails to explain how the relative measures within an SLA or the measure within multiple SLAs can impact customer satisfaction U.S. patent application Ser. No. 15/894,939 introduces the concept of call center performance overall and for individuals and measures SLA adherence but fails to explain how measurements in an SLA can impact customer satisfaction or the concept of multiple SLAs and the effect across each of these on customer satisfaction Other references have variously discussed SLA conformance tracking and the normalization of SLA data, however, none have related results to customer satisfaction.

Accordingly, it would be beneficial to have a system that can derive a measure of customer satisfaction from SLA conformance using relative measures rather an absolute measure such as the SLA being strictly met or not met.

It would further be beneficial to have a system that would allow for the derivation of customer satisfaction from multiple SLAs being measured for differing services from the same vendor.

It would still further be beneficial to have a system that would provide insight into and determine a level of satisfaction across SLAs from different vendors.

Therefore, a need exists for a system and method to derive, monitor, and measure customer satisfaction based on relative SLA performance.

SUMMARY OF THE INVENTION

Accordingly, it is desired to provide a system and method that is able to collect service level agreement (SLA) related information from SLA tracking systems and to relate the granular metrics to a customer satisfaction index.

It is also desired to provide a system and method that is able to collect such SLA information across multiple systems collecting a variety of SLA specific statistics and normalizing these into metrics used for a customer satisfaction index.

It is still further desired to provide a system and method that can relate and combine information from multiple SLA collection sources for services provided by a single vendor and to derive a single customer satisfaction related metric from these sources and feeds.

It is still further desired to provide a system that can relate and combine information from multiple SLA collection sources for unrelated services provided by multiple vendors and to derive a single customer satisfaction related metric for each vendor for their services that may be impacted (whether real or imagined) by a customer using both services.

It is still further desired to provide a system and method that can provide such a customer satisfaction metric across a vendor or a provider's customers such that it can be used proactively to prevent customer attrition and churn. Still further, the system and method could provide indicators as to what key metrics and performance indicators are driving customer satisfaction results allowing adjustment and fine-tuning of service offerings and work.

Finally, it is desired to use the resulting customer satisfaction metric to automatically adjust schedules, staffing, and priorities over the various input systems to optimize customer satisfaction, even if it means overriding existing system schedules and priorities. Where possible, the input systems can be adjusted or tuned to match the improved customer satisfaction index created from the holistic approach outlined herein. Machine learning is applied to automatically detect changes as these parameters are adjusted in the individual systems and the resultant changes in customer satisfaction metric are measured and used to automate adjustments.

In one configuration, a customer satisfaction index monitoring system is provided that includes a computer having software executing thereon where the software comprises a customer satisfaction index monitoring engine that receives data from SLA monitoring systems. These SLA triggering events include, but are not limited to, the actual SLA data and conformance data as well as the raw data used by the system to measure SLA conformance, which may include response times, backlogs, and function specific performance metrics.

The customer satisfaction index monitoring system is provided with the ability to automatically capture events from these external systems. This data capture can be through an RPA (Robotic Process Automation) robot that pulls data from the SLA monitoring system, or it could be through API (application programming interface) calls provided. Where available, raw data such as the individual event is captured and tracked in the customer satisfaction system as well. Examples of these include procurement orders coming into a procurement system and the various steps used to process these; tickets coming into a support system and the various stages in the lifecycle of these tickets; and repair orders coming in and the status of the diagnosis and repair or replacement of the items being serviced.

While SLA systems are often siloed and focused on maximum timelines and not exceeding certain thresholds; the customer satisfaction index system takes a more holistic view. Some examples follow where two systems may not be perfectly aligned and highlight why a customer satisfaction index approach is critical as opposed to simple SLA conformance measurement.

In considering a ticket system with an end goal of processing tickets within a fixed maximum timeframe, obviously it is poor strategy to simply close tickets to make a deadline whether or not the ticket is adequately solved. Clearly, having a satisfactory resolution to the problem before closing a ticket is critical.

As an example, in one instance a problem has been opened and the SLA is in jeopardy of being breached. The SLA system may automatically direct resources to solve the problem to meet the SLA at the expense of slowing down other tickets that are not yet at risk of exceeding the SLA. While this may not be a bad strategy to deal with short term problems, the risk of slowing down all tickets may in fact lead to a greater dissatisfaction from a larger number of users as opposed to having a single ticket take longer to resolve where it might be complex or unique in nature.

In another example, a customer may be having problems in procurement leading to support tickets being opened. A traditional SLA parameter used by a system may allow for a certain amount of time to respond and react to tickets, however the nature of the situation may be such that the problem is directly caused by another system. In this case, calls for escalation or faster turnaround times than normal may be required to maintain customer satisfaction. In a sense, the real time customer satisfaction index itself provides indicators as to when SLAs metrics should be dynamically adjusted to retain customer satisfaction, whether or not part of the SLA negotiation.

As an example, a customer in the previous example is having trouble getting procurement orders in and may be receiving the wrong devices due to problems in the procurement system. While solving the procurement issue is paramount, other related systems such as support systems, must also adjust to deal with the influx of customer opened tickets. Rather than using normal response times, response times during such events could be automatically adjusted by the system to be appropriately staffed during the event to address a predicted increase in call volume. The goal should be to resolve these tickets faster than simply what is allowed in the SLA. While adhering to the SLA may avoid traditional penalties, the reduction in customer satisfaction may end up with the loss of the customer.

In another configuration, the customer satisfaction index engine could be configured to capture customer service inputs such as survey data, ticket volume and types, as well as call volume or even manually entered data from customer service representatives. The system automatically looks for external indicators that may be indicative of customer satisfaction. Sentiment analysis is also performed on written and verbal communications looking for key words, content, brevity, and tone of communications.

As a first step, normalization of the data from the various feeds and inputs is performed to generate a baseline customer satisfaction value. This is a challenge to obtain and then convert this data into what the system can functionally use to analyze and make automated decisions. This data can then be tracked to understand SLA conformance and to have a generic normalized view across SLA systems.

For the granular SLA metrics, hourly and daily metrics must be normalized to compare appropriate timelines. Systems that report only high priority tickets cannot be compared in ticket volume to those that report all tickets. The goal with normalization at this level is to glean normal operating parameters and to develop a performance baseline for the system at hand. It is generally held that when the system is operating normally according to negotiated guidelines that customers are satisfied, and this is the starting point the system makes when the AI begins to learn customer satisfaction.

The customer satisfaction index system may or may not reflect the actual SLA values that have been negotiated, but rather will see the performance of the system through the raw data. As an example, if the call response time has been negotiated to 5 minutes, the customer satisfaction index system monitoring the raw data will likely see calls being picked up within this time period as the customer service department works to achieve their SLA.

In truth, the SLA itself is somewhat irrelevant to the customer satisfaction index in that the response times and the resolution of issues is primarily what drives customer satisfaction regardless of negotiated terms. That said, the system does benefit from knowing when SLAs are breached as these events may require escalation as these problems with vendors and suppliers may lead to termination of contracts even if customer satisfaction is relatively high.

A simple example would be an SLA requiring calls to be answered within 3 seconds. Even if a vendor cannot keep up with these aggressive answer times, it is highly likely that calls answered in 10 seconds will be satisfactory to customers.

It may seem counter-intuitive to terminate an arrangement where a vendor was answering calls within 5 seconds because they were not meeting the overly aggressive SLA. However, if the vendor is facing penalties, it could be that the vendor may want to terminate the relationship with the customer based on penalties all due to an overly aggressive and unrealistic SLA.

To get baseline data, the system considers industry norms for customer satisfaction including for example, data reflecting optimal and tolerable call answer times, as well as data reflecting optimal and tolerable fulfilment times. This data is then stored and compared with system metrics from the SLA raw data.

If customer satisfaction is decreasing due to these metrics being below industry norms, regardless of SLA, the system can automatically generate alerts and notifications about the situation.

The baseline data generated from industry norms may also be automatically adjusted in real time by machine learning that considers inputs from survey data and CRM data entered by service reps about calls received as well as external data that may impact customers. For example, industry norms for call answering may be 10 seconds, but a client with very urgent requirements, say an ambulance service or a security service, may have requirements for shorter time based on the particular need.

External events may also drive timelines and depending on what they are, may offset customer satisfaction and the system's weighting of events and leading to automatic adjustment of the dynamic score. For example, when a new iPhone is released, there may be high demand for the product, which will be understood by many will result in in procurement order delays. Similarly, in the event of inclement weather, a transportation service may have a longer than usual wait time for rebooking, which is typically understood and appreciated by those calling.

For this application the following terms and definitions shall apply:

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "process" and "processing" as used herein each mean an action or a series of actions including, for example, but not limited to, the continuous or non-continuous, synchronous, or asynchronous, routing of data, modification of data, formatting and/or conversion of data, tagging or annotation of data, measurement, comparison and/or review of data, and may or may not comprise a program.

The term "customer" as used herein means any company, user, or third party receiving a service from a provider, for which an established SLA has been negotiated.

The term "vendor" as used herein means any entity such as a service provider, a manufacturer, or a $3^{rd}$ party, or other entity providing services within an SLA.

In one configuration a system for gathering customer satisfaction related events is provided, the system comprising a computer having a storage and a network connection and software executing on the computer comprising a customer satisfaction engine automatically capturing and recording events as they occur, the customer satisfaction system using RPA bots having site access credential information to automatically obtain relevant events from the systems involved and updating a customer satisfaction index.

In another configuration, a method for obtaining customer satisfaction data accessed from a provider site by an RPA bot is provided, the method comprising the steps of automatically contacting the site with an RPA bot executing on a computer via a network connection, presenting site access credential information to the site with the RPA bot, which when authenticated enables the RPA bot to access the site, and accessing events and steps in a process required to fulfil a subpart of the SLA affecting event being addressed by the third party system.

In either case, the association of the data received with contextual customer satisfaction is key to the automatic nature of the system to gather and compare data as well as to make decisions based on the data analysis. In one configuration, a database or look up table of data is provided where diverse information is gathered and automatically normalized allowing the customer satisfaction system to then automatically compare similar data using diverse identifiers. Once data is identified and grouped according to the raw SLA parameters, data can be appended to a file to associate it with commonly used terms by the SLA system. Similarly, the data gathered from contextual information in CRM (customer relationship management) systems and external feeds relating to context information that may skew customer satisfaction is also read and automatically correlated to a weighting system to amplify or reduce the customer satisfaction metrics as read from the SLA systems. There are various ways to accomplish this, such as, for example, by appending information to the meta data of a file and multiplying it by the weight value. Likewise, data received in various formats may be identified and automatically converted into file formats used by the customer satisfaction system allowing for a fully automated and integrated system.

The aforementioned objects and goals may be achieved by providing a system for re-prioritizing incoming service requests. The system includes software executing on a computer, said software in communication with a plurality of service provider system computers to obtain ticket data, the ticket data indicative of a plurality of service requests made to the service provider system computers by one or more users, each user associated with one or more customers and the ticket data further indicative of fulfillment results for the service requests. The software has access to one or more service agreements which are indicative of one or more minimum results requirements for one or more service requests or types of service requests. The software further determines a score for each of the one or more customers based on comparing the minimum results requirements to the fulfillment results for each of the one or more users associated with each of the one or more customers over a period of time with the score adjusted to be worse if there are fulfillment results not meeting the minimum results requirements and the score further adjusted based on fulfillment results for one of the one or more customers in comparison to others of the one or more customers. The software further detects a new service request from a first one of the one or more customers at one or more of the service provider system computers and based on the score as compared to others of the one or more customers, the software re-prioritizing the new service request to be handled in a different order as compared to an order of receipt of the new service request.

In some aspects the software identifies at least one customer associated with one or more customer cancellations or service downgrades and adjusts how the score is computed to give greater or less weight to one or more of the fulfillment results to thereby adjust the score for other customers not associated with the one or more customer cancellations or service downgrades. In other aspects the re-prioritizing is further based on a size of the first one of the one or more customers compared to others of the one or more customers. In still other aspects the others of the one or more customers are customers with one or more pending service requests. In yet other aspects the plurality of service requests are selected from the group consisting of: a telecommunications device order, a telecommunications service order, a technical support ticket, a billing issue request and combinations thereof. In still other aspects the plurality of service requests includes multiple service requests at each of the plurality of service provider system computers. In yet other aspects the system reprioritizes the new request based on a context sensitive weight of the new request based on the software determining an impact to the score of the new request based on what order the system reprioritizes the new request and an expected change in resolution time associated with the reprioritization. In still other aspects the score is determined in part based on survey data collected following completion of one or more of the plurality of service requests. In still other aspects when the software identifies one or more external events which do not count against the minimum results requirements and/or the fulfillment results and adjusts the score associated with a set of requests comprising one or more of the plurality of requests so that the one or more external events are counted against the minimum results requirements and/or the fulfillment results for purposes of determining the score and reprioritizing at least one request of the set of requests.

Other objects are achieved by providing a system for determining service agreement fulfillment results scoring. The system includes software executing on a computer, said software in communication with a plurality of service provider system computers to obtain ticket data, the ticket data indicative of a plurality of service requests made to the service provider system computers by one or more users, each user associated with one or more customers and the ticket data further indicative of fulfillment results for the service requests. The software has access to one or more service agreements which are indicative of one or more minimum results requirements for one or more service requests or types of service requests. The software determines a score for each of the one or more customers based on the minimum results and the ticket data. The software further identifies at least one customer associated with one or more customer cancellations or service downgrades associated with a first set of customers comprising at least one of the one or more customers and said software adjusting the score for others of the one or more customers who are not part of the first set of customers but have ticket data correlated to the ticket data of the first set of customers such that the score is changed or is computed differently for the others of the one or more customers.

In some aspects the software re-prioritizes a new service request from the others of the one or more customers to be handled in a different order based on the reduction in the score associated with those others of the one or more customers. In still other aspects the adjusting of the score modifies a weight given to at least some of the ticket data when computing the score such that computation of the score is modified so as to be computed differently as compared to an order of receipt of the new service request. In other aspects the re-prioritizing is further based on a size of the first one of the one or more customers compared to others of the one or more customers. In still other aspects the others of the one or more customers are customers with one or more pending service requests. In yet other aspects the plurality of service requests are selected from the group consisting of: a telecommunications device order, a telecommunications service order, a technical support ticket, a billing issue request and combinations thereof. In still other aspects the plurality of service requests includes multiple service requests at each of the plurality of service provider system computers. In yet other aspects the system reprioritizes the new request based on a context sensitive weight of the new request based on the software determining an impact to the score of the new request based on what order the system reprioritizes the new request and an expected change in resolution time associated with the reprioritization. In still other aspects the score is determined in part based on survey data collected following completion of one or more of the plurality of service requests. In yet other aspects when the software identifies one or more external events which do not count against the minimum results requirements and/or the fulfillment results the software adjusts the score associated with a set of requests comprising one or more of the plurality of requests so that the one or more external events are counted against the minimum results requirements and/or the fulfillment results for purposes of determining the score and reprioritizing at least one request of the set of requests.

Other objects of the invention and its features and advantages will become more apparent from consideration of the following drawings and accompanying detailed description.

DETAILED DESCRIPTION OF THE INVENTION

Figure 1:
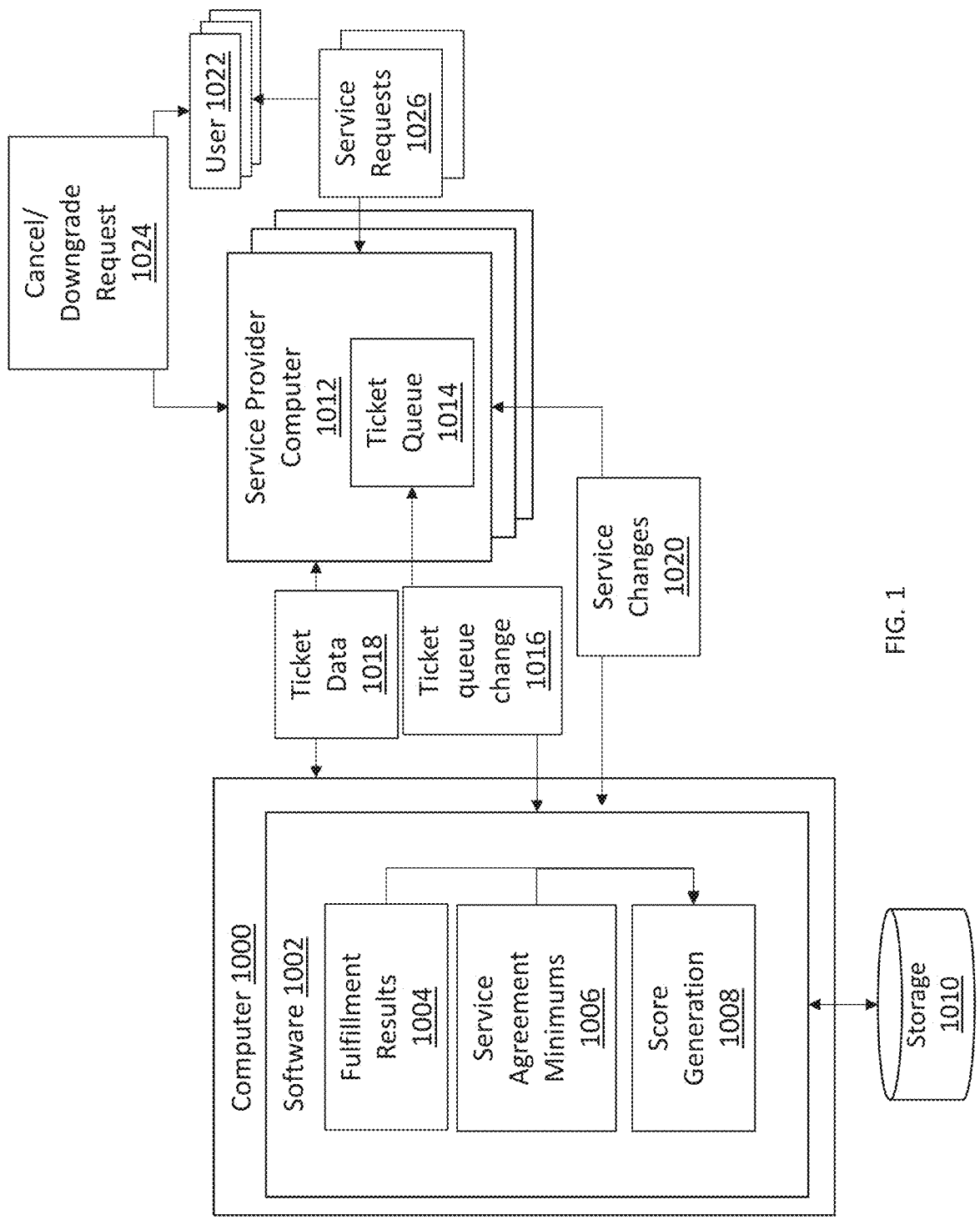
FIG. 1 is a functional flow diagram of the overall system.

Referring now to the drawings, wherein like reference numerals designate corresponding structure throughout the views.

The following examples are presented to further illustrate and explain the present invention and should not be taken as limiting in any regard.

Referring to FIG. 1, the system computer 1000 includes software 1002 executing thereon. The software uses fulfillment results 1004 and service agreement minimums 1006 along with potentially various other data from storage 1010 (or other external systems) in order to generate a score 1008 which represents a customer's satisfaction with the service provider. This score is determined based on past service requests 1026 and their associated ticket data 1018. Further, when a customer cancels or downgrades 1024 service, this is also captured by the ticket data 1018 sent to the computer 1000 as a downgrade/cancellation 1024 can be considered a type of service request. Particularly, service change data 1020 may be considered a sub-set of the ticket data 1018. From the overall ticket data, including cancellations/downgrades along with responsiveness and how well and fast service requests 1026 are handled as referenced in the ticket data 1018, the software 1002 determines fulfillment results 1004 as compared to service agreement minimums 1006 and generates a score 1008. While meeting the minimum may be considered adequate under the agreement, in general customers will expect faster service and thus barely meeting the minimum at all times is likely to result in a poor satisfaction rating, leading to a higher likelihood of a downgrade/cancellation 1024 which is desirable to avoid. The score generation can also take advantage of historical ticket data stored in the storage 1010 in order to generate the score 1008. This score can be generated on a user, company, division or other group basis. When a particular score is lower relative to others, the computer 1000 can identify from the ticket data 1018 when a user 1022 has made a new service request 1026 and when that particular user 1022 is associated with a low score either based on the company, group or individually or otherwise. The service provider computer 1012 will have a particular ticket queue 1014 based on when the request was received and may set some order of priority for the new service request. However, that queue 1014 is generally not based on the score as a default. The generated score 1008 is used in conjunction with the ticket data 1018 for a new request from a relatively low scoring user 1022 such that the software 1002 changes the ticket queue 1016 to re-prioritize the user 1022 associated with a comparatively low score. As a result, the score is likely to improve and the customer is less likely to downgrade/cancel 1024 in theory. However, there may be instances where the factors contributing to the score need to be adjusted or re-weighted and the system provides for a learning function to accomplish this. Notably, when a customer cancels/downgrades service, 1024, this is reflected in a service change 1020 and compared to the generated score 1008. This customer may be expected to have a relatively good score but still cancels/downgrades 1024. With the downgrade request 1024 there may be some survey data or reasons input into the system indicating why the customer was not satisfied. Which if that is the case, the survey data is used to determine if the reason given is associated with the service provider's fulfillments results 1004 being inadequate. In some cases, no survey results or reasons are available. Based on available information when there is a downgrade, the system looks at ticket data 1018 (including any relevant historical data from the storage 1010) to identify other customers whose scores may be incorrectly higher than they should relative to similar ticket data 1018 (including possibly historical data) from a given time period. The software 1002 then identifies similar fulfillment results 1004 in other customers and adjusts a weight of those fulfillment results in score generation 1008 for particular service request 1026 types. As a result, score generation 1008 is adjusted based on a feedback loop driven by customer downgrade/cancellation requests 1024. The service requests 1026 can also include upgrade requests to expand service offerings and this can further be associated with high satisfaction, therefore, in a similar way that fulfillment results associated with activities leading to a downgrade/cancellation can impact score generation 1008, service upgrades/expansion can also indicate the fulfillment results that are the likely factor that contributed to the service upgrade. Thus, new requests that are associated with high likelihood of increasing the score may be re-prioritized at the ticket queue 1014 by the software 1002.

Figure 2:
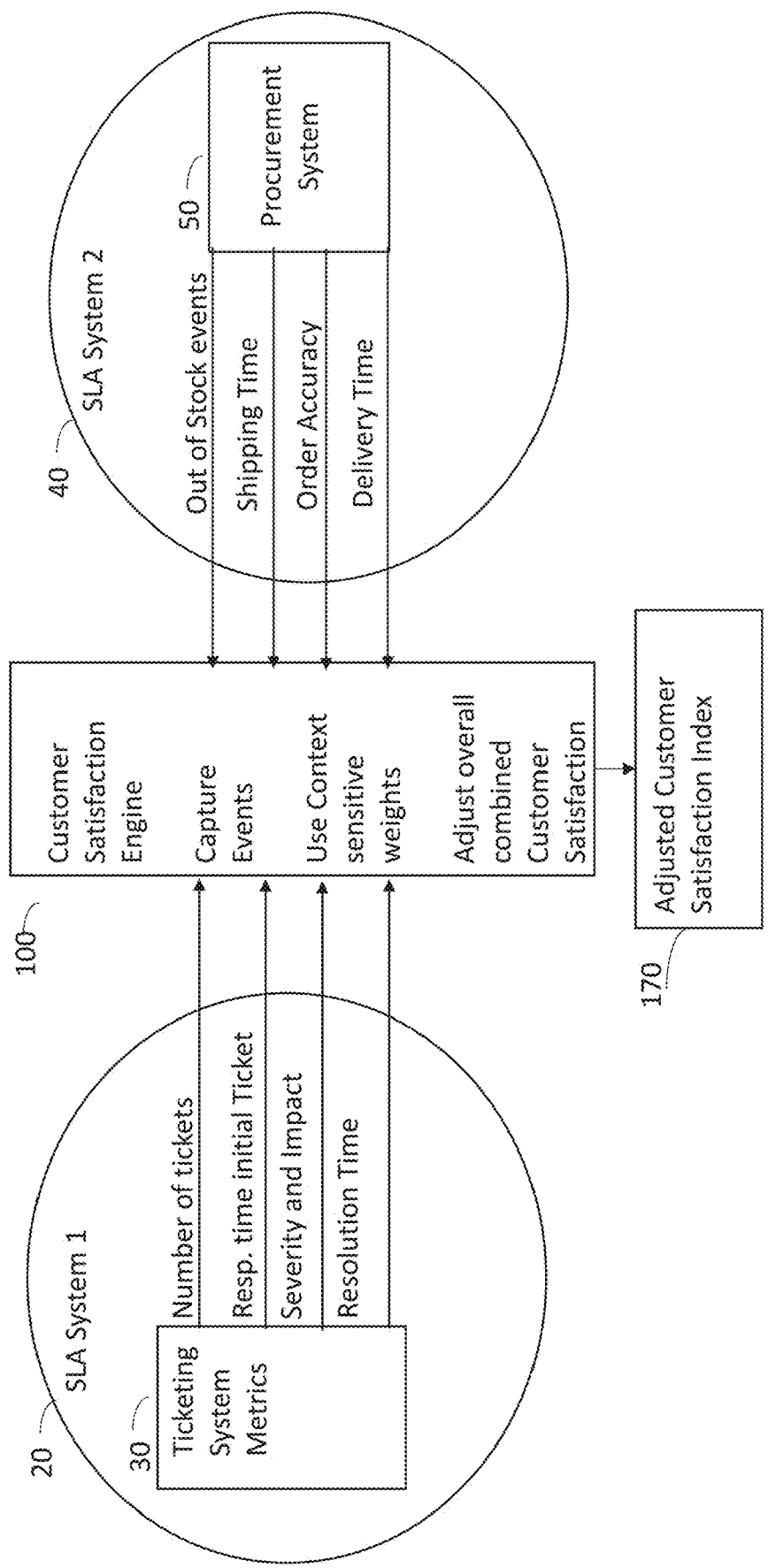
FIG. 2 is a functional flow diagram illustrating the aggregation of disparate SLA events

Referring to FIG. 2 a high-level view of the aggregation of disparate SLA system events is depicted. The customer satisfaction engine (100) captures events from external SLA systems (20, 40) such as, a ticket system (30) that supplies raw data, such as but not limited to, the number of tickets, response times, severities, and resolution times. Another external SLA system, a procurement system (50) provides raw data, such as but not limited to, out of stock events, shipping time, order accuracy and delivery times. This data can be considered ticket data 1018 as shown in FIG. 1

The customer satisfaction engine captures the events and automatically applies context sensitive weighting to combine and adjust the information into a customer satisfaction index (170).

Figure 3:
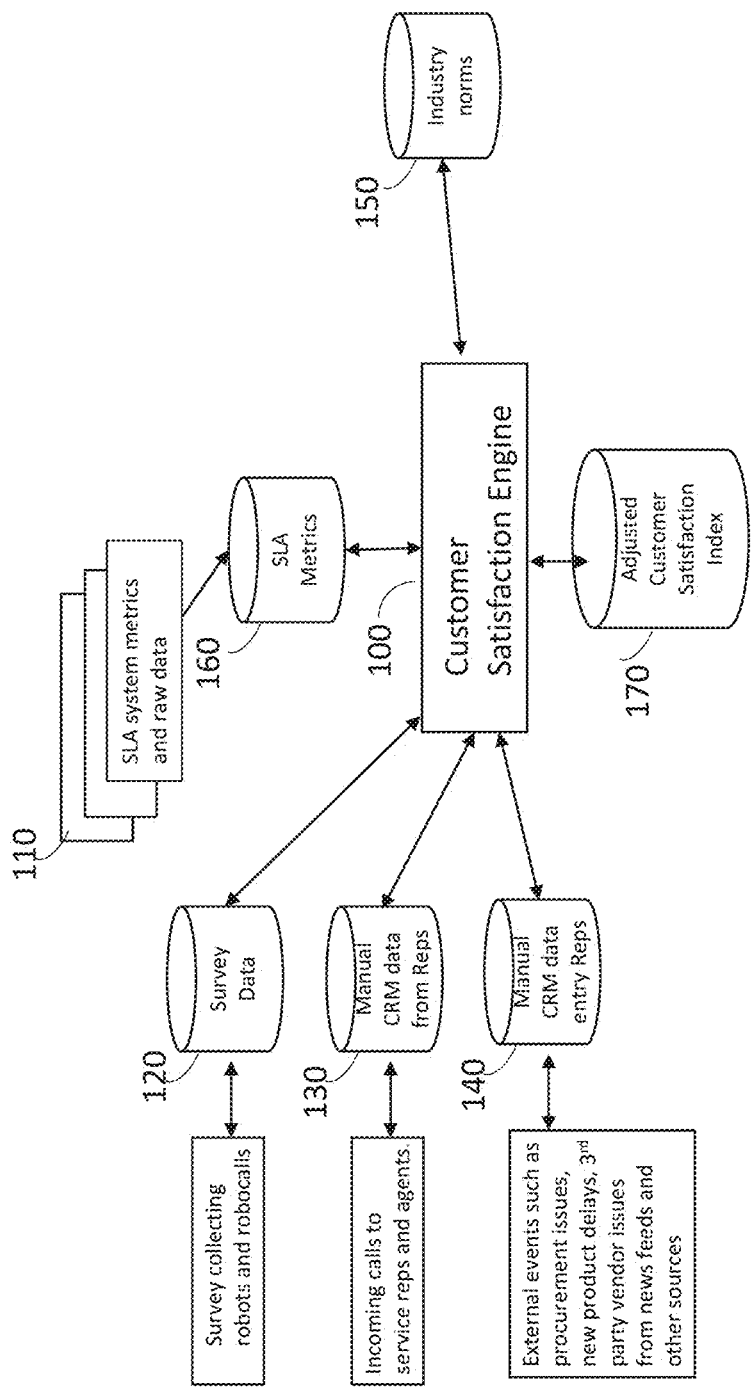
FIG. 3 shows various sources of inputs to the customer satisfaction index

Turning now to FIG. 3 a depiction of various sources of input to the customer satisfaction index is provided. SLA metrics (160) are pulled from various SLA systems (110) as raw events by the customer satisfaction engine (100). Survey data (120) from survey collecting RPAs and robocalling, Manual CRM entered data (130) from incoming calls, and manual CRM data (140) from external events are used by the customer satisfaction engine (100) along with industry norms (150) to generate the adjusted customer satisfaction index (170), again this data can be considered part of the ticket data 1018 of FIG. 1. The customer satisfaction engine weighs this information as part of the software 1002 in order to perform the score generation 1008.

Figure 4:
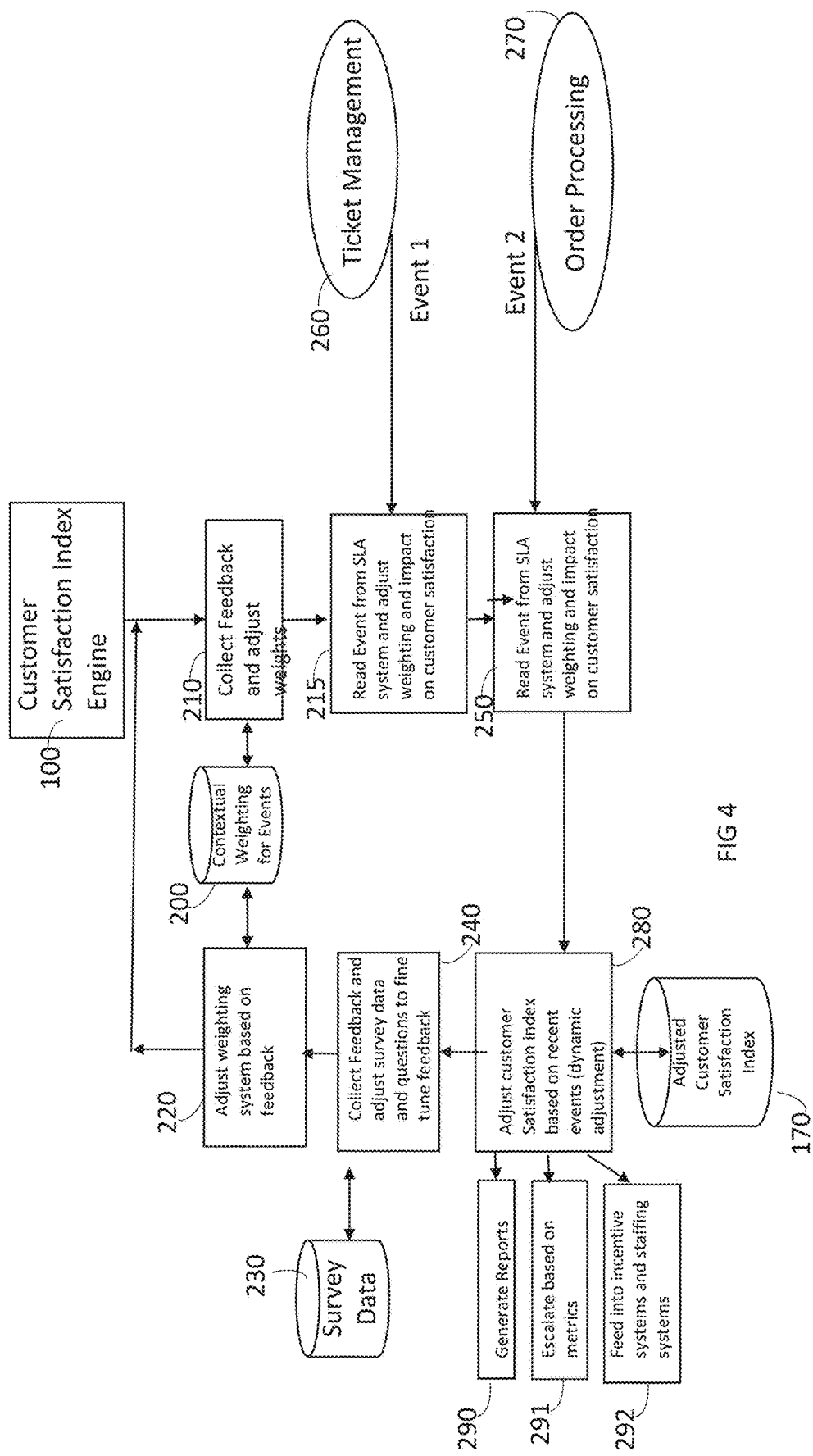
FIG. 4 is a functional flow diagram illustrating the use of weighting and adjustments of satisfaction index

FIG. 4 shows a depiction of weighting and adjustments of the satisfaction index. The customer satisfaction index (100) receives feedback and adjusts weights (210) by taking data (240) from survey data (230). The data and feedback are used to adjust (280) the customer satisfaction index (170) and to generate reports (290), escalate based on metrics (291) and feed into HR incentive systems (292). The escalation may come in the form of a ticket queue change 1016 generated by the software 1002.

The system also reads events (215) from ticket management systems (260) and reads data (250) from order processing systems (270) to combine these (280) with the above data to generate an adjusted customer satisfaction index (170) which would involve generating the score 1008 as shown in FIG. 1.

Figure 5:
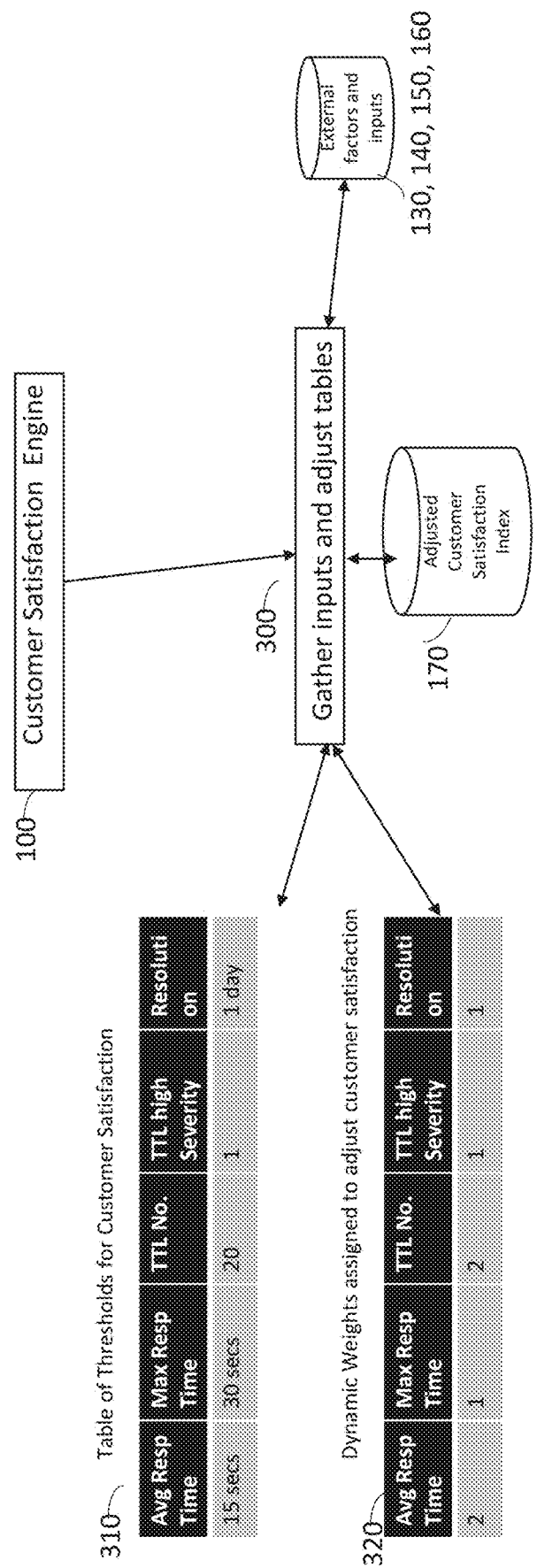
FIG. 5 is a detailed view of weighting and adjustments

In FIG. 5 a more detailed view of the weight calculations and the tables used is presented. A table of thresholds (310) for customer satisfaction based on support tickets is shown as an example. The table (310) comprises metrics or thresholds for average response time, maximum response time, total number of tickets, total number of high severity tickets and resolution times.

Data obtained via the parsing of CSV (comma separated value) files or direct through API (application programming interfaces) with a ticketing system provides the metrics on a per-transaction basis. By gathering this data, the system populates the average, and maximum response times as well as the total number of entries.

For CSV type files, the system can work with inputs that are periodically generated by an administrator and read into the system. These can be done at regular intervals, with a resolution that should be at least daily.

Alternatively for better results, a script file can be used to pull the data from the source system, in this example the ticketing system, to generate the file in regular intervals. Without the need for manual intervention the script can run hourly or at least every few hours providing better resolution and granularity with the results. The system provides a directory monitoring function where, it looks for an updated file to be placed in a specified location and can automatically read and load this file as soon as it is detected. A series of locking mechanisms are used as semaphores to ensure the file update is complete before it is read in to prevent corruption or partial results.

Ideally the source system provides and API for gathering that data that can bypass the file reading mechanisms described above. In such cases, the API will provide specific function calls to get the data required from the source system. In such cases, the interface to the system can be instantaneous providing ideal results. In some system APIs, it is possible to receive notification of changes allowing the system to gather the data on tickets and metrics in real time as it changes.

As a further illustration of the above, take the example used in FIG. 4 of tracking resolution times of tickets. In a case where a CSV file is periodically created and read by the system, be that daily or hourly, the resolution time, unless timestamped by the source system, will be based on how often the update is read. If we generate the file at 10 am, and the ticket was resolved an 10:01 am the same day, the system will not be aware of such a change until the next update. In some cases, the data may be timestamped in the csv file, but in many cases, the system just receives an update status and must use the time stamp of when it was read. For this reason, a change notification-based API system is ideal, as it can trigger an event as soon as the status changes occur.

The system continues to monitor the system through periodic CSV files or through the API to detect the changes in status allowing the system to detect when issues have been resolved. The timestamps are kept in the system regardless of whether accessible through the source system such that the monitoring of resolution time in this case is performed.

Additionally, a table of weights (320) is shown as an example for how weights are assigned to each of the values in the threshold table (310). In this example, the average response time values being within the threshold are assigned a weighting of 2 whereas the maximum response time weighting is 1. The system adjusts the customer satisfaction index twice as much in either direction based on the average response time. This table is intended to be illustrative only as the system uses numerous variables for customer satisfaction that can span multiple systems. Further, this table of weights can be adjusted as cancellations/downgrades 1024 or service requests 1026 that indicate an upgrade/expansion as described previously. After adjustment, the score generation 1008 may be weighted differently and cause ticket queue changes 1016 to occur/not occur when they otherwise would have/not.

While some weights are assigned default valued by the system to start with, others are adjusted from external sources such as surveys, CRM data, and manual entries. Some examples follow.

Surveys are sent to users of the system after resolution of tickets. A series of questions are posed, on both the over all satisfaction as well as the satisfaction about the specific issue which was resolved. The system utilized this data in multiple ways.

First, the type of data. Say as an example the tickets pertain to a CRM system that the Ticket had to do with running reports. The system factors in the overall satisfaction reported to add weight to how important events related to reporting affect customer satisfaction. Any one user may be an outlier but using such methods over large pools of data provides good insight. It may be that salespeople have to run their reports before going home for the evening and when there are issues, they get frustrated more that they would with a similar issue on another part of the system. Worse yet, if commissions are affected or quota measurements affected, one can imagine that these areas of the system would have a major impact to overall satisfaction should the system not work well.

Using the above analogy of reporting, the system has now learned that if there are a larger number of problems in the reporting part of the system (as read from the raw data (160) from the SLA systems or ticket systems, we can estimate that the effect on the adjusted customers satisfaction index (170) will be large.

The exact set of weights is determined over time with information gathered again by means such as surveys and CRM system entries and manual entries and can be further based on customer patterns in terms of expanding/contracting service usage and spend. In the case of survey, a satisfaction of 1-5 may be set in the questionnaire. The drop from completely satisfied would be used as the weight, and then this is adjusted by averaging all the entries that pertain to this category.

Apart from surveys, another input area is the manual CRM entries by reps (130). When these originate from incoming calls, there may be a direct entry made that someone is very dissatisfied because a certain aspect of the system is not performing well. The helpdesk takes the call and identifies key areas of the system, just as was done in the survey and in the ticket. Let's again use the reporting function in an example. While discussing with the caller, the help desk technician will poll the used about the area of the system (reporting), their satisfaction (not satisfied) and level of dissatisfaction (2 of 5) for example, this data is stored in the CRM in record entries and call logs that are read in (again by API, by CSV files, or scripts) and parsed by the customer satisfaction engine (100). This data along with the survey data can be included in the ticket data 1018 as a subset thereof and usually associated with a particular ticket so that the fulfillment results of that particular ticket can be correlated to the survey/satisfaction data.

There are also exceptions which are accounted for by the system. Take an example of a procurement system where users are trying to order new iPhone. When a new iPhone comes out, there is always a lot of demand and limited inventory. In some case, users may express their dissatisfaction with the system or the personnel, but this is related to things out of the direct control of the system and should not affect the overall satisfaction index in any lasting way. When such events occur, we may indeed see some frustration and low satisfaction from users about delivery times, color choices, or availability of items. We don't want these to skew the normal satisfaction values of the systems availability or response times. Rather, the system can take in these expected events (140) as manual entries and attempt to pre-order, and also warn users of pending shortages due to demand to confront unrealistic expectations. The customer satisfaction index can provide a banner to be input to order fulfilment and ordering that shows a message such as 'due to popular demand, iPhone availability as well models and color choices are limited. We will do our best to fulfil your order but may require you to wait on backorder for a specific model or color'.

Other examples of external factors include weather related events. Take again a procurement system that handles shipping. When weather hits, there may be delays and postponement of deliveries outside the control of the target system. While this may drive down customer satisfaction, again by forewarning users of these external events (140) by entering them into the system the dissatisfaction is directed away from the system and more towards the event itself. The customer satisfaction index can provide a banner to be input to order fulfilment and ordering that shows a message such as 'bad weather expected in northeast from January 2-4 may cause shipment delays outside our control, thank you for your understanding'.

The customer satisfaction engine (100) takes that data (300) from the threshold table (310) and applies a weighting in the Dynamic weight table (320) to provide an adjusted customer satisfaction index score (170). Based on survey data and other external information (130,140, 150,160) the data in table (320) can be dynamically adjusted placing higher importance (and more weight) on factors that may have arisen with the external systems.

Although the invention has been described with reference to a particular arrangement of parts, features, and the like, these are not intended to exhaust all possible arrangements or features, and indeed many other modifications and variations will be ascertainable to those of skill in the art.

What is claimed is:

1. A system for re-prioritizing incoming service requests comprising:
    a computer;
    software executing on said computer, said software in communication with a plurality of service provider system computers to perform:
        obtaining ticket data, the ticket data indicative of a plurality of service requests made to the service provider system computers by one or more users, each user associated with one or more customers and the ticket data further indicative of fulfillment results for the service requests;
        accessing to one or more service agreements which are indicative of one or more minimum results requirements for one or more service requests or types of service requests;
        determining a score for each of the one or more customers based on comparing the minimum results requirements to the fulfillment results for each of the one or more users associated with each of the one or more customers over a period of time with the score adjusted to be worse if there are fulfillment results not meeting the minimum results requirements and the score further adjusted based on fulfillment results for one of the one or more customers in comparison to others of the one or more customers;
        detecting a new service request from a first one of the one or more customers at one or more of the service provider system computers and based on the score as compared to others of the one or more customers, re-prioritizing the new service request to be handled in a different order as compared to an order of receipt of the new service request;
        wherein when the software identifies one or more external events which do not count against the minimum results requirements and/or the fulfillment results, the software adjusts the score associated with a set of service requests comprising one or more of the plurality of service requests so that the one or more external events are counted against the minimum results requirements and/or the fulfillment results for purposes of determining the score and reprioritizing at least one service request of the set of service requests.

2. The system of claim 1 wherein the software identifies at least one customer associated with one or more customer cancellations or service downgrades and adjusts how the score is computed to give greater or less weight to one or more of the fulfillment results to thereby adjust the score for other customers not associated with the one or more customer cancellations or service downgrades.

3. The system of claim 1 wherein the re-prioritizing is further based on a size of the first one of the one or more customers compared to others of the one or more customers.

4. The system of claim 1 wherein the others of the one or more customers are customers with one or more pending service requests.

5. The system of claim 1 wherein the plurality of service requests are selected from the group consisting of: a telecommunications device order, a telecommunications service order, a technical support ticket, a billing issue request and combinations thereof.

6. The system of claim 1 wherein the plurality of service requests includes multiple service requests at each of the plurality of service provider system computers.

7. The system of claim 1 wherein the system reprioritizes the new service request based on a context sensitive weight of the new service request based on the software determining an impact to the score of the new service request based on what order the system reprioritizes the new service request and an expected change in resolution time associated with the reprioritization.

8. The system of claim 1 wherein the score is determined in part based on survey data collected following completion of one or more of the plurality of service requests.

9. A system for determining service agreement fulfillment results scoring comprising:
    a computer;
    software executing on said computer, said software in communication with a plurality of service provider system computers to perform:
        obtaining ticket data, the ticket data indicative of a plurality of service requests made to the service provider system computers by one or more users, each user associated with one or more customers and the ticket data further indicative of fulfillment results for the service requests;

accessing to one or more service agreements which are indicative of one or more minimum results requirements for one or more service requests or types of service requests;

determining a score for each of the one or more customers based on the minimum results and the ticket data;

identifying at least one customer associated with one or more customer cancellations or service downgrades associated with a first set of customers comprising at least one of the one or more customers and said software adjusting the score for others of the one or more customers who are not part of the first set of customers but have ticket data correlated to the ticket data of the first set of customers such that the score is changed or is computed differently for the others of the one or more customers;

wherein when the software identifies one or more external events which do not count against the minimum results requirements and/or the fulfillment results, the software adjusts the score associated with a set of service requests comprising one or more of the plurality of service requests so that the one or more external events are counted against the minimum results requirements and/or the fulfillment results for purposes of determining the score and reprioritizing at least one service request of the set of service requests.

10. The system of claim 9 further comprising: said software re-prioritizing a new service request from the others of the one or more customers to be handled in a different order based on the reduction in the score associated with those others of the one or more customers.

11. The system of claim 10 wherein the re-prioritizing is further based on a size of the first one of the one or more customers compared to others of the one or more customers.

12. The system of claim 9 wherein the adjusting of the score modifies a weight given to at least some of the ticket data when computing the score such that computation of the score is modified so as to be computed differently as compared to an order of receipt of the new service request.

13. The system of claim 9 wherein the others of the one or more customers are customers with one or more pending service requests.

14. The system of claim 9 wherein the plurality of service requests are selected from the group consisting of: a telecommunications device order, a telecommunications service order, a technical support ticket, a billing issue request and combinations thereof.

15. The system of claim 9 wherein the plurality of service requests includes multiple service requests at each of the plurality of service provider system computers.

16. The system of claim 9 wherein the system reprioritizes the new service request based on a context sensitive weight of the new service request based on the software determining an impact to the score of the new service request based on what order the system reprioritizes the new service request and an expected change in resolution time associated with the reprioritization.

17. The system of claim 9 wherein the score is determined in part based on survey data collected following completion of one or more of the plurality of service requests.

* * * * *